United States Patent [19]

Kelton

[11] 4,296,738
[45] Oct. 27, 1981

[54] CYLINDRICAL SOLAR ENERGY COLLECTOR

[76] Inventor: Wallace G. Kelton, 1748 NE. 58th St., Fort Lauderdale, Fla. 33334

[21] Appl. No.: 156,147

[22] Filed: Jun. 3, 1980

[51] Int. Cl.³ ............................. F24J 3/02; F28F 1/00
[52] U.S. Cl. .................................... 126/443; 165/163; 165/177
[58] Field of Search .............. 126/442, 443, 441, 417, 126/448; 165/163, 162, 142, 177, 178; 138/38

[56] References Cited

U.S. PATENT DOCUMENTS

| | | |
|---|---|---|
| 2,213,894 | 9/1940 | Barry ................................... 126/443 |
| 3,853,114 | 12/1974 | Gaydos ............................... 126/443 |
| 4,018,215 | 4/1977 | Pei ....................................... 165/142 |
| 4,027,653 | 6/1977 | Meckler .............................. 126/443 |
| 4,043,318 | 8/1977 | Pei ....................................... 126/443 |
| 4,080,954 | 3/1978 | de Wilde et al. ................... 126/443 |
| 4,086,911 | 5/1978 | Futch .................................. 126/443 |
| 4,089,325 | 5/1978 | Brola .................................. 126/443 |
| 4,120,285 | 10/1978 | Nugent ............................... 126/443 |
| 4,186,724 | 2/1980 | Nelson ................................ 126/443 |
| 4,215,674 | 8/1980 | Riggs et al. ........................ 126/443 |

Primary Examiner—Daniel J. O'Connor
Attorney, Agent, or Firm—John J. Byrne

[57] ABSTRACT

A solar energy collector 16 for utilizing the energy of the sun to heat a working fluid. The collector comprises a core conduit 30 having a working fluid inlet end 32 and a closure 38 fitted across the other end. A single return conduit 42 is spirally wound upon the exterior surface of the core conduit, wherein the windings are in close lateral juxtaposition but with the return conduit and the core conduit both exposed to direct impingement of solar rays. A transparent tube 48 coaxially surrounds the core conduit 30. Annular members 52 and 54 are positioned at each end of the transparent tube 48 to maintain the spatial relationship of the members and form an annular air insulation zone around the core conduit 30 and return conduit 42.

15 Claims, 4 Drawing Figures

U.S. Patent  Oct. 27, 1981  4,296,738
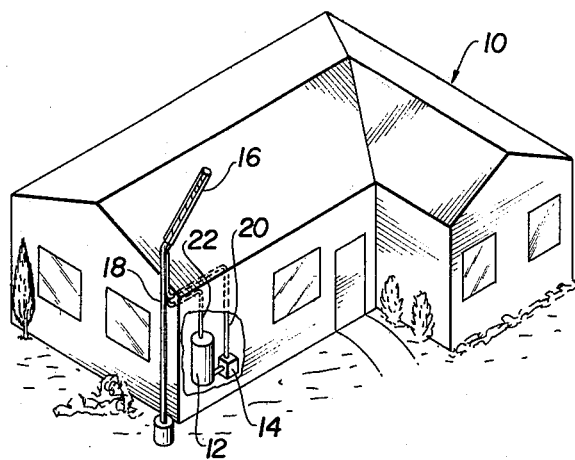
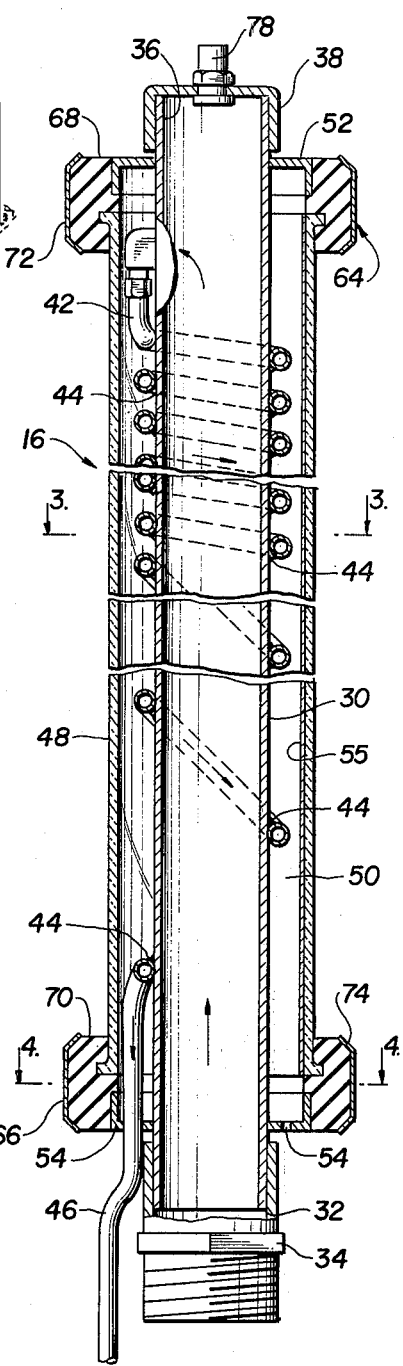
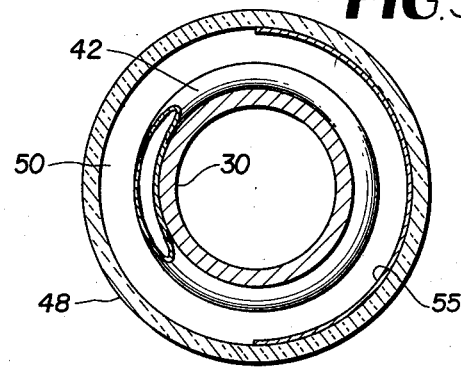
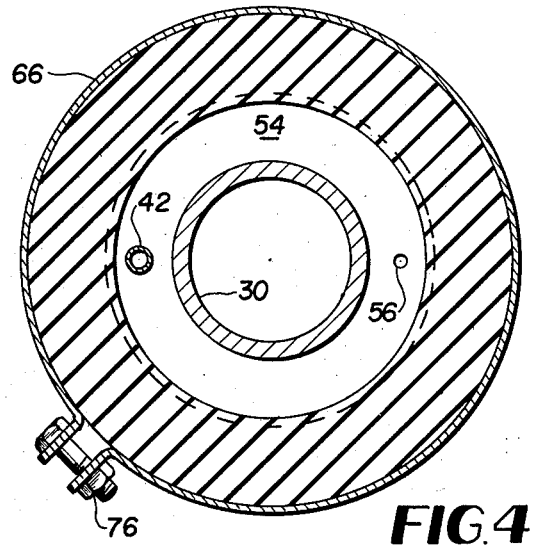

CYLINDRICAL SOLAR ENERGY COLLECTOR

BACKGROUND OF THE INVENTION

This invention relates to a solar energy collector. More specifically, this invention relates to a compact solar collector with improved structural stability and efficiency of operation.

Solar collectors have been theorized for decades and basically operate on a principle of concentrating solar energy to heat a working fluid or solution which can be transported, stored and utilized over an extended period of time. Notwithstanding widespread knowledge of the above basic principle, solar energy collectors known in the past have not achieved a high degree of commercial acceptance and utilization.

At least one previously known solar collector comprises a transparent tube which encloses a generally linear coaxial conduit which extends through the transparent tube and then returns in a loose spiral pattern spaced about the linear conduit. A reflector member is mounted within the transparent tube and is adjustable to direct solar rays onto the linear inlet and spiral return conduits. While this system offers a degree of theoretical appeal, fluid flow within the collector is constant because the size of the tube is constant. Accordingly, flow rates must be very low or a number of units must be tied in series to provide effective heating. In addition, mechanisms which are employed to continuously regulate reflector position are subject to mechanical failure over the course of time.

Another previously known system comprises a first linear inlet conduit and a second coaxial conduit which is corrugated to define a double series of helically extending ridges and valleys. The corrugations serve to form a return spiral flow path along the entire length of the inlet conduit. A transparent heat shield coaxially surrounds both the first and second conduits and a parabolic reflecting surface is mounted at a distance about the heat shield to focus solar energy onto the exterior surface of the second conduit. This system completely isolates the first conduit from direction application of solar energy from the sun. Additionally the dual return path provides a rapid return that does not permit maximum utilization of the heating potential of the unit. Still further, the close proximity of the transparent heat shield to the second conduit does not permit full utilization of a potential for insulation of the conduit elements. Finally the parabolic reflector element is positioned by cantilever supports at a distance that jeopardizes the mechanical integrity of the unit in high winds, etc.

The difficulties suggested in the proceeding are not intended to be exhaustive, but rather are among many which may tend to reduce the effectiveness and user satisfaction of prior solar energy collector devices. Other noteworthy problems may also exist; however, those presented above should be sufficient to demonstrate that solar energy collectors appearing in the past will admit to worthwhile improvement.

OBJECTS OF THE INVENTION

It is therefore a general object of the invention to provide a novel solar energy collector which will obviate or minimize difficulties of the type previously described.

It is a specific object of the invention to provide a novel solar energy collector which is compact and capable of heating a working fluid to a useful degree with a single cycle of fluid transit through the unit.

It is another object of the invention to provide a novel solar energy collector wherein direct solar energy rays may be utilized to heat an incoming working fluid conduit as well as further elevating the temperature of working fluid in an outgoing fluid conduit.

It is still another object of the invention to provide a novel solar energy collector which may be operated over a wide degree of conditions and circumstances with a high degree of safety.

It is a further object of the invention to provide a novel solar energy collector which has an enhanced degree of structural integrity over a wide range of environmental loads and which will exhibit an advantageous life cycle.

It yet a further object of the invention to provide a novel solar energy collector which may be facilely fabricated and maintained in an advantageous operating condition.

It is still a further object of the invention to provide a novel solar energy collector wherein incoming working fluid may be heated and mixed prior to further heating in a return conduit.

BRIEF SUMMARY OF THE INVENTION

A solar energy collector, in accordance with a preferred embodiment of the invention, which is intended to achieve at least some of the foregoing objects includes a generally linear core conduit having a working fluid inlet and a closure fitted across the other end of the core conduit. A single return conduit is laterally tapped into the other end of the core conduit in a posture adjacent to but axially spaced from the core conduit closure and is spirally wound about the exposed core conduit. The windings of the return conduit in an upper portion may be in close lateral juxtaposition and serve to slowly return a working fluid while being heated by direct application of solar energy to the return conduit. In a lower section of the linear core conduit the degree of spacing between adjacent return conduit windings may be greatly increased such that only one or two turns exist around the lower portion of the linear core conduit. In this zone increased solar energy rays fall directly on the core conduit to rapidly heat incoming working fluid while heat loss from the returning heated fluid is minimized. A transparent tube coaxially surrounds the core conduit and is dimensioned to form an annular space around the core and return conduit. Annular members are positioned at each end of the transparent tube to maintain the spatial relationship of the conduit members and to form an annular air insulation zone about the core conduit and return conduit.

THE DRAWINGS

Other objects and advantages of the invention will become apparent from the following detailed description of a preferred embodiment thereof taken in conjunction with the accompanying drawings wherein:

FIG. 1 is an axonometric view of an operative environment suitable to advantageously utilize a solar energy collector in accordance with the subject invention;

FIG. 2 is a partially sectioned, and broken away, detail side view of a solar energy collector in accordance with a preferred embodiment of the invention;

FIG. 3 is a cross-sectional view taken along section line 3—3 in FIG. 2 and discloses a return conduit wrapped around a central core conduit both of which are enclosed within a transparent cylinder having a semi-cylindrical reflection member; and FIG. 4 is a cross-sectional view taken along section line 4—4 in FIG. 2 and discloses an annular clamp member and an air bleed hole in an annular end member to equilize pressure on the interior of the transparent cylinder with ambient pressure.

DETAILED DESCRIPTION

Referring now to the drawings and particularly to FIG. 1 thereof there will be seen an axonometric representation of an operative environment suitable to advantageously utilize a solar energy collector in accordance with a preferred embodiment of the subject invention.

More specifically, a building 10 such as a residence, office building, or the like is provided with a working fluid storage container 12 having an insulation cover which is conventional in the art. A pump 14 is utilized to draw working fluid from the collector 12 and to pump it upwardly to solar energy collector 16 positioned adjacent the building.

The collector 16 is attached to a post or column 18 which is supported upon a ground surface by a buried concrete block or the like. Although a single collector is disclosed it is contemplated that a plurality of collectors may be mounted upon a single or dual support towers as desired. The collector(s) are connected to the storage container 12 by a separate supply conduit 20 and a return conduit 22.

Turning now to FIG. 2 there will be seen a detailed cross-sectional view of a solar energy collector 16 in accordance with a preferred embodiment of the invention. More specifically, a generally linear core cylinder 30 has an inlet end 32 which is mated with a threaded adapter 34 which in turn may be coupled to the working fluid inlet or supply 20. The inlet end 32 of the linear core 30 is provided at the other end 36 with a cover closure or cap 38 to fluidically close the upper end of the inlet conduit and form a working fluid mixing chamber.

A 90° tapping joint 40 is mounted at the other end of the core conduit 30 in a posture which is adjacent to but laterally spaced from the end closure 38 and provides a fluid outlet for heated working fluid from the core conduit. A single return conduit 42 is connected to the joint 40 and in an initial stage of return flow, the conduit 42 is spirally wound about the core conduit 30 in intimate heat transfer relationship wherein the lateral spacing between adjacent windings is approximately equal to the diameter of the return conduit. In order to increase the heat transfer coupling of the return conduit 42 with the generally linear core 30 the windings may be brazed or welded at the spiral junction locations 44 as the conduit spirally wraps around the core 30. At approximately a mid-point location on the return conduit the spacing between adjacent windings greatly increases such that on a lower half of the core conduit, only one or two windings of the return conduit are made before the conduit reaches a posture generally adjacent the inlet end of the core as at 46.

In the upper zone of relatively close spacing, solar energy will directly impinge upon the return conduit to heat returning fluid slowly flowing therethrough and at the same time directly impinge upon an upper portion of the core conduit between the windings to heat working fluid within the core. In a lower portion of the core conduit, where cooler incoming fluid exists, the wide spacing of the return conduit permits maximum direct heat application to the central core conduit and at the same time minimizes heat loss of fluid within the return conduit to the core conduit before it exits into a return conduit 24.

The core conduit and return conduit are preferably fabricated from a metallic material with a high coefficient of heat conduction such as copper, aluminum, or the like. The conduits are chemically surfaced treated, plated or painted to enhance the heat absorption characteristics and reduce the heat transmission capability of the conduits. In this regard the conduits may be painted with a black coating having a rough exterior surface so that solar energy is advantageously trapped by the conduits.

A transparent tube 48 coaxially extends about the core conduit 30 and is dimensioned to have a diameter sufficiently greater than the diameter of the core conduit so as to create an annular air insulation zone 50 which enropes the core conduit 30 and return conduit 42. Annular members 52 and 54 are positioned at opposite ends of the core conduit 30 and transparent tube 48 and serve to hold the members in rigid spatial relationship and enclose the air insulation zone 50. An air bleed aperture 56 is fashioned through at least annular member 54, note FIG. 4, to enable air pressure to be continuously equalized between the interior heat insulation zone 50 and the ambient air pressure.

A reflector element 55 is contiguously mounted within the transparent cylinder 48 and may optimumly comprise a semicylindrical shell, note particularly FIG. 3. Alternatively the inner surface of the transparent member 48 may be provided with a highly reflective plating.

The structural integrity of the system is maintained by the provision of an upper 64 and a lower 66 mechanical clamp assembly. More specifically, resilient ring members 68 and 70 respectively are provided with inwardly contoured surfaces to cooperatively engage the peripheral elements of annular ring members 52 and 54 as well as the end-most portions of the transparent tube 48. Metallic clamp rings 72 and 74 are fitted about the resilient members 68 and 70 respectively and are releasably held in position by mechanical fastening units such as nut and bolt combinations 76, note FIG. 4. The core conduit 30 is fitted at its upper end with an excess pressure release valve 78 which may be of a type known in the art.

In operation relatively cool working fluid enters the solar collector 16 and is pumped upwardly through the large diameter, linear core, conduit 30. In a preferred embodiment this conduit has a diameter of 6 inches and length of 6 feet. As the fluid slowly rises in the conduit it is heated by direct impingement of solar energy upon the core conduit. At the other end of the conduit 30 warmed fluid within the conduit is reversed and mixed prior to entering into the spiral return conduit 42. Fluid within the return conduit is further heated by direct impingement of solar energy upon the exterior of the return conduit. In one embodiment once the return conduit reaches approximately a mid-point of the core conduit, the slope of the spiral is increased to enable an increased amount of direct solar energy to be imparted to the inlet end of the core. In a preferred embodiment the return conduit is ¾ of an inch in diameter and 76 feet in length. This preferred dimensional relationship provides the core conduit with a flow area which is 64 times greater than the flow area of the return conduit.

In describing a solar energy collection in accordance with a preferred embodiment of the invention, those skilled in the art will recognize several advantages which singularly distinguish the invention from previously known devices.

A particular advantage of the invention is the provision of a relatively large diameter linear inlet conduit and a single return flow conduit which is compactly wrapped about the core conduit. In one embodiment an upper portion of the core has a spacing approximately equal to the return conduit diameter and an increased spacing in a lower position. This spaced combination of wrappings provides for maximum heating of the working fluid within an upper section of the conduit which is then quickly delivered to a storage cylinder for future use.

Additionally, the structural arrangement of the inner and outer conduits permits direct solar energy to be utilized to heat the inner conduit and the relatively cool working fluid at the inlet. At the upper end of the core conduit, direct solar energy is further permitted to contact the inner conduit as well as the exterior or return conduit.

The air bleed aperature as well as the safety release valve provides for pressure equalization and safety regulation of the system over a wide range of environmental and/or operating conditions.

The unit is structurally rugged and compact with no moving parts or delicate mountings so as to ensure a long operating life for the unit.

Where maximum heating is desired, a plurality of units may be mounted upon a single pole or tower. The novel structural arrangement of the large linear core and small exterior return conduit wrapped about the core with direct solar heating of both provides a compact system which will effectively heat a working fluid to a useful degree without requiring a large amount of space and/or series coupling of the units.

In an optimum embodiment the cross-sectional area of the core conduit is 64 times as great as the cross-sectional area of the single return conduit. This dimensional relationship permits the collector unit to apply a high concentration of solar energy to the working fluid as it passes through the system and thus enables the unit to operate as a single unit.

The mechanical coupling of the unit at an upper and lower end thereof in cooperation with a contiguous interior reflector permits manual adjustment of the reflective unit to an optimum seasonal posture without adding complexity to the structure.

Additionally the compact character of the unit, which may functionally replace an entire roof mounted panel enables intallation without disturbing an existing roofing surface or requiring extra bracing and the like of the roof.

Still further, the provision of the return conduit tap downstream of the outer end of the core conduit provides a working fluid mixing chamber or zone at the upper end of the conduit to minimize the occurrance of heat flow planes within the collector.

In describing the invention, reference has made to a preferred embodiment. Those skilled in the art, however, and familiar with the disclosure of the subject invention, may recognize additions, deletions, modifications, substitutions and/or other changes which will fall within the purview of the subject invention and claims.

What is claimed is:

1. A solar energy collector for utilizing solar energy to heat a working fluid, said solar energy collector comprising:

a generally hollow metallic core cylinder having a working fluid inlet at one end thereof and closure means fitted across the other end thereof;

a single metallic return conduit means having an inlet end tapped into said core cylinder in a posture generally at the other end of said core cylinder and a fluid outlet end extending generally adjacent to said inlet end of said core cylinder, said return conduit means being wrapped in intimate heat exchange contact about said core cylinder;

transparent cylindrical tube means coaxially mounted about said core cylinder and having a diameter sufficiently greater than said core cylinder such that a peripheral space exists between the interior of said transparent cylinder and the exterior of said return conduit means wrapped about said core cylinder; and annular means at each end of said transparent cylinder means and said core cylinder for maintaining the spatial coaxial relationship of said core cylinder within said transparent cylindrical tube means and for forming an annular air insulation chamber around said core cylinder and said metallic return conduit means, wherein working fluid may be pumped into said core cylinder, pass through said core cylinder and said metallic return conduit within said transparent tube means and be heated by solar energy within the air insulation envelope.

2. A solar energy collector for utilizing solar energy to heat a working fluid as defined in claim 1 and further comprising:

generally semi-cylindrical reflector means mounted adjacent to but spaced from said core cylinder and said metallic return conduit means for reflecting solar rays onto said core cylinder and said metallic return conduit.

3. A solar energy collector for utilizing solar energy to heat a working fluid as defined in claim 1 or 2 and further comprising:

heat absorption coating means applied upon the exposed surfaces of said metallic core cylinder and said metallic conduit means.

4. A solar energy collector for utilizing solar energy to heat a working fluid as defined in claim 1 and further comprising:

automatic pressure relief valve means mounted upon said end closure means of said metallic core cylinder.

5. A solar energy collector for utilizing solar energy to heat a working fluid as defined in claims 1 or 4 and further comprising:

at least one air-pressure equilizing aperature provided through said annular means at at least one end of said transparent cylindrical means.

6. A solar energy collector for utilizing solar energy to heat a working fluid as defined in claim 1 wherein:

the cross-sectional area of said core cylinder is substantially greater than the cross-sectional area of said single return conduit means.

7. A solar energy collector for utilizing solar energy to heat a working fluid as defined in claim 6 wherein:

the cross-sectional area of said core cylinder is 64 times greater than the cross-sectional area of said single return conduit means.

8. A solar energy collector for utilizing solar energy to heat a working fluid as defined in claim 1 wherein:

said return conduit means being spirally wound about said core cylinder and with the windings thereof being mutually juxtaposed but laterally spaced on approximately half of the cylinder core beginning at said other end thereof and approximately the other half of said core cylinder being substantially without windings of said return conduit means and exposed directly to solar rays.

9. A solar energy collector for utilizing solar energy to heat a working fluid, said solar energy collector comprising:

a generally hollow core cylinder having a working fluid inlet at one end thereof and closure means fitted across the other end thereof;

a single return conduit means having an inlet end tapped into said core cylinder in a posture generally at the other end of said core cylinder and a fluid outlet end extending generally adjacent to said inlet end of said core cylinder, said return conduit means being wound in intimate spiral heat exchange contact about said core cylinder, and the cross-sectional area of said core cylinder being substantially greater than the cross-sectional area of said return conduit means;

heat absorption coating means applied upon the exposed surfaces of said core cylinder and said return conduit means;

transparent cylindrical tube means coaxially mounted about said core cylinder and having a diameter sufficiently greater than said core cylinder such that a peripheral space exists between the interior of said transparent cylinder and the exterior of said return conduit means wrapped about said core cylinder; and annular means at each end of said transparent cylinder means and said core cylinder for maintaining the spatial coaxial relationship of said core cylinder within said transparent cylindrical tube means and for forming an annular air insulation chamber around said core cylinder and said metallic return conduit means, wherein working fluid may be pumped into said core cylinder, pass through said core cylinder and said metallic return conduit within said transparent tube means and be heated by solar energy within the air insulation envelope.

10. A solar energy collector for utilizing solar energy to heat a working fluid as defined in claim 9 wherein:

the lateral surfaces of said spiral windings of said return conduit means being mutually juxtaposed but laterally spaced on approximately half of the cylinder core beginning at said other end thereof and approximately the other half of said core cylinder being substantially without windings of said return conduit means and exposed directly to solar rays.

11. A solar energy collector for utilizing solar energy to heat a working fluid as defined in claim 10 and further comprising:

at least one air-pressure equilizing aperture provided through said annular means at at least one end of said transparent cylindrical means.

12. A solar energy collector for utilizing solar energy to heat a working fluid as defined in claim 11 and further comprising:

automatic pressure relief valve means mounted upon said end closure means of said core cylinder.

13. A solar energy collector for utilizing solar energy to heat a working fluid as defined in claim 11 wherein:

the cross-sectional area of said core cylinder is 64 times greater than the cross-sectional area of said return conduit means.

14. A solar energy collector for utilizing solar energy to heat a working fluid as defined in claim 11 and further comprising:

generally semi-cylindrical reflector means mounted adjacent to but spaced from said core cylinder and said return conduit means for reflecting solar rays onto said core cylinder and said return conduit.

15. A solar energy collector for utilizing solar energy to heat a working fluid as defined in claim 1 or 9 wherein:

said single return conduit is normally tapped into a lateral surface of said core cylinder in a posture adjacent to but axially spaced from said core cylinder closure means wherein heated working fluid within said core cylinder will abut against said closure means and be reversed and mixed before entering said single return conduit means.

* * * * *